No. 638,931. Patented Dec. 12, 1899.
R. D. KIMBALL & A. A. McKENZIE.
CONDUIT.
(Application filed Mar. 31, 1899.)
(No Model.) 4 Sheets—Sheet 1.
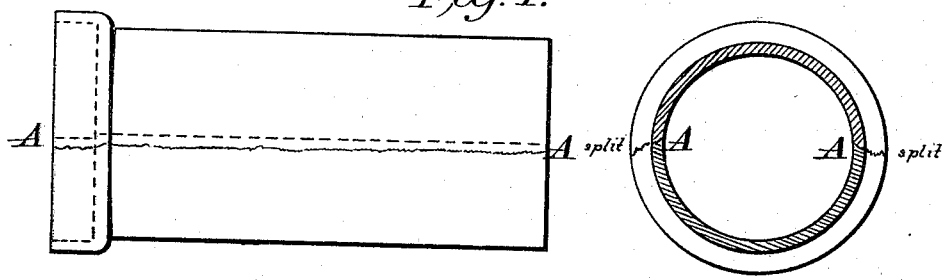
Fig. 1.
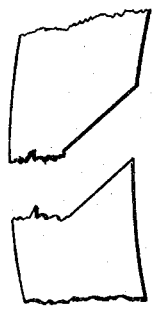
Detail of Split
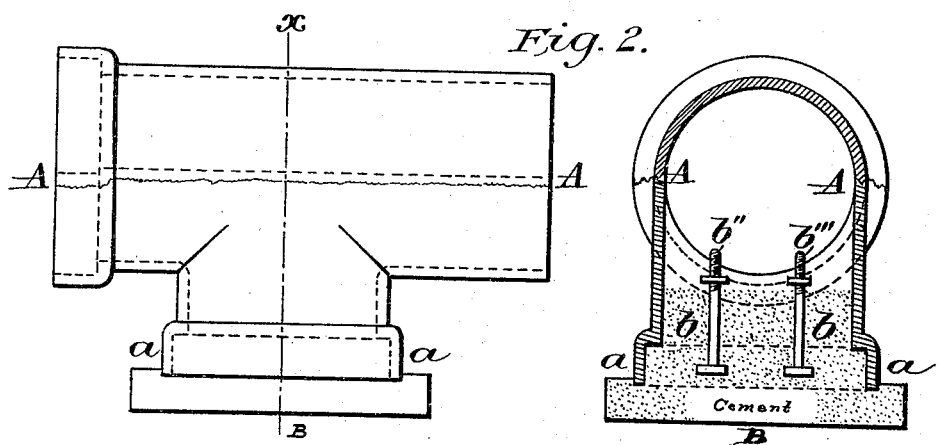
Fig. 2.
WITNESSES: INVENTORS
D. D. Kimball. Richard D. Kimball
Charles W. Kimball. Alexander A. McKenzie
BY
Richard D. Kimball ATTORNEY.

No. 638,931. Patented Dec. 12, 1899.
R. D. KIMBALL & A. A. McKENZIE.
CONDUIT.
(Application filed Mar. 31, 1899.)
(No Model.) 4 Sheets—Sheet 2.
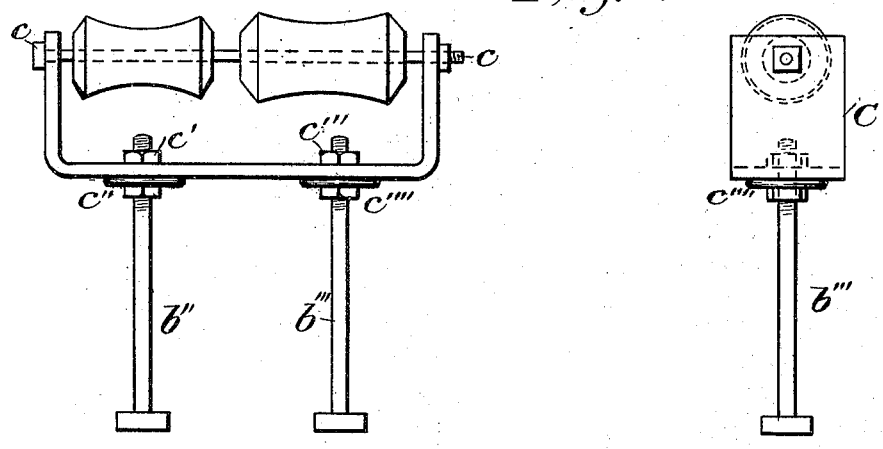
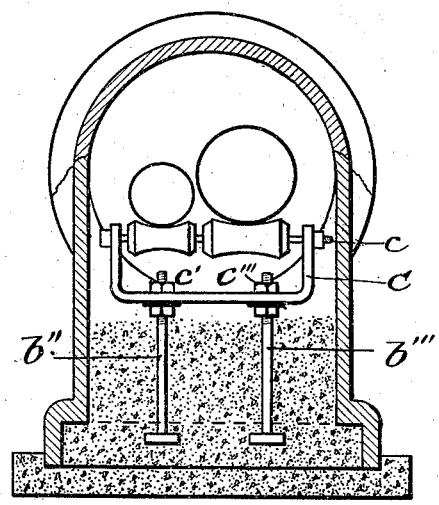

No. 638,931. Patented Dec. 12, 1899.
R. D. KIMBALL & A. A. McKENZIE.
CONDUIT.
(Application filed Mar. 31, 1899.)
(No Model.) 4 Sheets—Sheet 3.
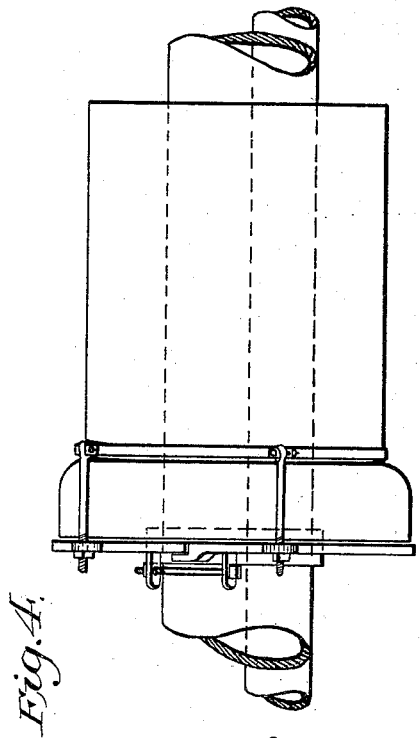
Fig. 4.
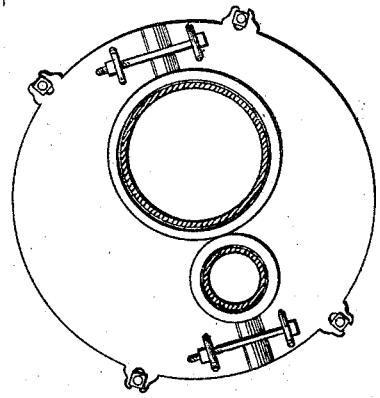
WITNESSES:
D. D. Kimball.
Charles W. Kimball.
Richard D. Kimball,
Alexander A. McKenzie, INVENTORS.
BY
Richard D. Kimball, ATTORNEY.
THE NORRIS PETERS CO., PHOTO-LITHO., WASHINGTON, D. C.

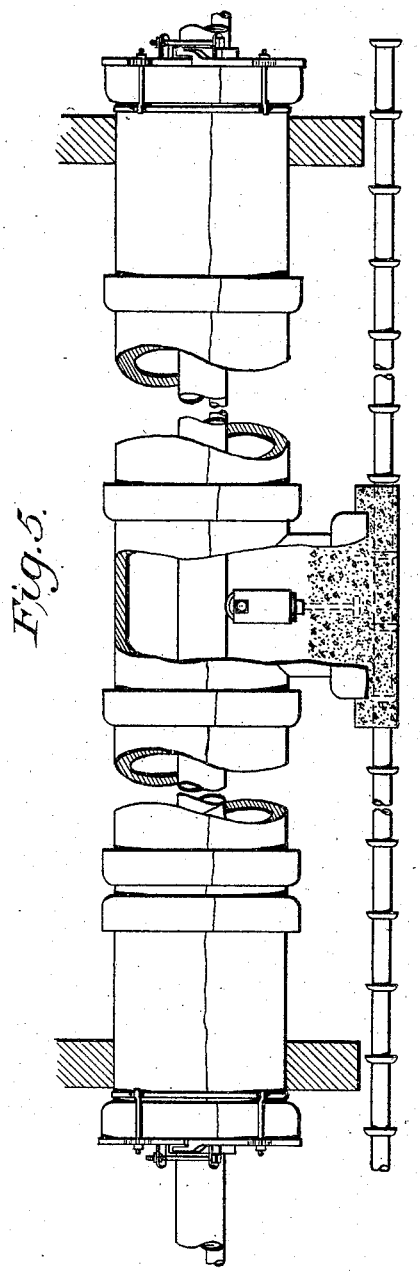

UNITED STATES PATENT OFFICE.

RICHARD D. KIMBALL, OF MALDEN, MASSACHUSETTS, AND ALEXANDER A. McKENZIE, OF HANOVER, NEW HAMPSHIRE.

CONDUIT.

SPECIFICATION forming part of Letters Patent No. 638,931, dated December 12, 1899.

Application filed March 31, 1899. Serial No. 711,305. (No model.)

*To all whom it may concern:*

Be it known that we, RICHARD D. KIMBALL, residing at Malden, in the county of Middlesex, in the State of Massachusetts, and ALEXANDER A. McKENZIE, residing at Hanover, in the county of Grafton, in the State of New Hampshire, citizens of the United States, have invented certain new and useful Improvements in Conduits for and the Insulation of Pipes Conveying Gaseous or Liquid Matter, of which the following is a full, clear, and exact description, reference being had to the accompanying drawings, forming a part of this specification, in explaining its nature.

The invention relates to the use of split cement, earthen, or metal pipe as a conduit in which are placed pipe or pipes conveying gaseous or liquid matter surrounded by insulating material, the object of the invention being to so protect the pipe or pipes as to reduce to a minimum the transmission of heat to or from the matter conveyed and when used in underground work to reduce the cost of conduit work, to render accessible the conveying pipe or pipes during the process of laying and testing, and to provide for the support of the conveying pipe or pipes in a stable and secure manner.

Hitherto the method of providing a conduit or incasement for the protection of pipes conveying the gaseous or liquid matter to a distance has been largely confined to the use of a brick or wooden conduit when underground, in which the pipe or pipes conveying the liquid or gaseous matter are placed, these pipes being wrapped or covered with some form of insulating material to prevent loss or absorption of heat. A space is thus left around the pipe or pipes so protected or insulated in which the air will circulate, the effect of this circulation being largely to increase or decrease the temperature of the matter thus conveyed.

Briefly stated, the first object attained by the method upon which Letters Patent are desired is to provide a conduit, practically water and air tight, in which is placed the conveying pipe or pipes properly supported, the pipe or pipes being surrounded by insulating material, (preferably not attached to the conveying pipe or pipes,) the insulating material being of such nature as to hold within its particles a large amount of confined air, which although it is free to expand cannot circulate to such an extent as to cause any considerable change of temperature in the gaseous or liquid matter conveyed in the pipe or pipes. Preferably some such material as cork, ground into particles about one-fourth of an inch in diameter, is used for this purpose; but we do not confine ourselves to this particular material.

The second object attained by this method is to produce a conduit, practically water and air tight, which can be constructed at much less cost per running foot than the present brick or wooden conduit, thus reducing the initial cost and at the same time greatly reducing any change of temperature in the matter conveyed.

To produce the above results, the following parts are designed: first, a sectional conduit-pipe for inclosing conveying pipe or pipes and insulating material, of such size as is necessary and of suitable length, the conduit-pipe to be so designed and made as to be, when laid in cemented joints, practically water and air tight; second, a suitable and secure foundation upon which rests an adjustable roll-frame for the support of the conveying pipe or pipes, the object of the adjustable portion of the roll-frame being to allow the correction of any slight error or deflection from the true grade, and, third, a shutter or method of closing the ends of the conduit which projects into a building or other inclosure, the object being to further prevent any circulation of air or the entrance of vermin into the conduit. To illustrate or describe these various parts, reference is made to the accompanying drawings.

Figure 1 shows a side and end view of the cement, earthen, or metal sectional conduit with a section of the split. Fig. 2 shows a section and side view of the cement, earthen, or metal sectional conduit with a side outlet or extension placed near the middle of the length of pipe. Fig. 3 shows an adjustable pipe roll-carrier for supporting the conveying pipe or pipes within a sectional pipe-conduit. Fig. 4 shows a shutter with one or more collars, of asbestos or other non-conducting material, through which the conveying pipe or pipes pass. Fig. 5 is an assembly drawing, showing two conveying-pipes inclosed in a sectional conduit with adjustable roll-frame on its foundation and shutter in position, insulating material being shown in blue.

Referring to Fig. 1, a view of the pipe-conduit A shows the direction of the longitudinal split slanting downward, the desired angle being produced by a cut in the pipe made on the proper angle while the pipe is in the process of manufacture, the cut being made deep enough to insure the proper separation of the pipe on the desired line after the pipe is made complete. Enough of the material is left uncut to prevent the separation of the sections in the further process of manufacture and the warping and twisting consequent upon such separation, the ragged edge forming with cement-mortar a joint practically water and air tight. The object of the inclined cut is to prevent the water from entering the conduit-pipe, this form of cut acting as a watershed.

In Fig. 2, $a$ shows that portion of the conduit which incloses the part of concrete or masonry foundation upon which rests the adjustable pipe roll-carrier which supports the conveying pipe or pipes. B shows that portion of the foundation extending under that part of the pipe shown at $a$. $b$ shows the concrete or masonry filling upon which the roll-carrier rests, and A shows the inclined split, as shown in Fig. 1, this method forming a support for the conveying pipe or pipes independent of the conduit itself and preventing the weight of the former producing a deflection of the latter. This method also forms a chamber within which the masonry base is formed, the whole making a continuation or extension of the conduit-pipe itself. $b''$ and $b'''$ show the bolts which hold the pipe roll-carrier in place, the bolts being embedded in the concrete or masonry.

In Fig. 3, C is the roll-carrier frame, showing the pipe-rolls in place as applied to this system of conduit. $c$ is the rod upon which the rolls are placed. $c'$, $c''$, $c'''$, and $c''''$ are the adjusting-nuts, which are screwed upon the threaded bolts $b''$ and $b'''$, the adjustment being obtained by raising or lowering the lower nuts in connection with the upper nuts, which also act as lock-nuts. This method of adjustment allows of the bringing of the conveying pipe or pipes to exact grade.

In Fig. 4 is shown the method of closing the end of the conduit entering building or inclosure to prevent the circulation of air in the conduit and consequent increase or decrease of temperature of the matter in the conveying pipe or pipes, also preventing the passage of vermin from one building or inclosure to another and preventing the undesired removal of the insulating material. The shutter E is made of wood or metal and is for convenience divided at $e$. Collars made of asbestos or other non-conducting material through which the conveying pipe or pipes may pass and be left free to expand are shown at $e'$ and $e''$. When the shutter is made (for convenience in applying) in sections, it is drawn together by means of bolts or links joining the sections, as shown at $e'''$ and $e''''$, the proper tension being obtained by means of screw-threaded bolts and nuts. There are various ways of fastening the shutter to the conduit-pipe, one of which is shown in the drawings at four points designated by $e'''''$, the shutter when drawn into place forming practically an air-tight stop to the pipe-conduit.

In Fig. 5 is shown a combination of the above parts or devices in a broken section with conveying pipe or pipes in position, all the conduit-sections being laid with both ends and longitudinal joints united by cement-mortar, the whole forming practically a water and air tight conduit for the conveying pipe or pipes.

Having thus fully described the nature, construction, and use of our invention, we wish to secure by Letters Patent and claim—

1. In a cement, earthen or metal conduit, sections having longitudinal cuts made at a downward slant or angle, an unglazed, rough or serrated edge or surface for the adherence of cement, the whole combined for the purpose of making a water and air tight joint or connection between upper and lower sections of conduit as shown and described.

2. In a sectional cement, earthen or metal conduit, a section of the conduit having a side outlet or extension, a concrete or masonry base inclosed in and supporting said extension, a pipe-roll carrier or other support for pipe or pipes anchored in or resting on said base and a conveying pipe or pipes supported on said carrier, substantially as shown and described.

3. In a sectional cement, earthen or metal conduit, a shutter provided with suitable openings for the conveying pipe or pipes having a flexible collar constructed of asbestos or other non-combustible material so made as to allow of the free expansion or contraction of the pipes or pipe incased in the conduit but retaining the insulating material and confined air while excluding exterior air or vermin.

4. In a cement, earthen or metal conduit, sections having longitudinal cuts made at a downward slant or angle, an unglazed, rough or serrated edge or surface, sections having side outlet or extension, a concrete or masonry base inclosed in and supporting said extension, a pipe-roll carrier or other support for conveying pipe or pipes anchored in or supported by said base, shutters for closing terminal points of conduit having non-combustible collars or guides for conveying pipe or pipes, the whole forming a complete air and water tight conduit for the protection and insulation of pipe or pipes conveying gaseous or liquid matter, substantially as shown and described.

In testimony whereof we have affixed our signatures in the presence of two witnesses.

RICHARD D. KIMBALL.
ALEXANDER A. McKENZIE.

Witnesses:
D. D. KIMBALL,
CHARLES W. KIMBALL.